US006922450B2

(12) United States Patent
Yuda et al.

(10) Patent No.: US 6,922,450 B2
(45) Date of Patent: Jul. 26, 2005

(54) DIRECTION OF ARRIVAL ESTIMATOR AND DIRECTION OF ARRIVAL ESTIMATION METHOD

(75) Inventors: Yasuaki Yuda, Kawasaki (JP); Takashi Fukagawa, Kawasaki (JP); Youichi Nakagawa, Tokyo (JP); Masahiro Mimura, Tokyo (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 836 days.

(21) Appl. No.: 09/846,390

(22) Filed: May 2, 2001

(65) Prior Publication Data

US 2004/0012525 A1 Jan. 22, 2004

(30) Foreign Application Priority Data

May 12, 2000 (JP) ........................................ 2000-139994

(51) Int. Cl.[7] .............................. H04L 27/22; H03D 1/04
(52) U.S. Cl. ........................................ 375/316; 375/346
(58) Field of Search ................................. 375/316, 346, 375/349, 347, 140, 142, 147, 343, 344

(56) References Cited

U.S. PATENT DOCUMENTS

| | | | | | |
|---|---|---|---|---|---|
| 4,734,701 A | * | 3/1988 | Grobert | ...................... | 342/380 |
| 4,771,289 A | * | 9/1988 | Masak | ......................... | 342/383 |
| 4,920,348 A | * | 4/1990 | Baghdady | ................... | 342/433 |
| 5,524,023 A | * | 6/1996 | Tsujimoto | .................... | 375/232 |
| 5,739,788 A | * | 4/1998 | Dybdal et al. | .............. | 342/359 |
| 5,761,237 A | * | 6/1998 | Petersen et al. | ............ | 375/148 |
| 6,349,218 B1 | * | 2/2002 | Nakagawa et al. | ...... | 455/562.1 |
| 6,430,239 B1 | * | 8/2002 | Ferreol | ........................ | 375/347 |
| 6,470,043 B1 | * | 10/2002 | Lo et al. | ..................... | 375/144 |
| 6,647,276 B1 | * | 11/2003 | Kuwahara et al. | ....... | 455/562.1 |

FOREIGN PATENT DOCUMENTS

JP    11251964    9/1999

OTHER PUBLICATIONS

English Language Abstract of JP 11-251964.
"Detection of Direction and Number of Impinging Signals in array Antenna Using Cyclostationarity" by Hiroyuki Tsuji et al., Collection of Institute of Electronics, Information and Communication Engineers, Jan. 1998 vol. J81–B–II, No. 1, pp. 19–28, and an English language translation of (a portion) Section 3.1.

* cited by examiner

Primary Examiner—Chieh M. Fan
Assistant Examiner—Jason M. Perilla
(74) Attorney, Agent, or Firm—Greenblum & Bernstein, P.L.C.

(57) ABSTRACT

An A/D converter converts the signal received by an array antenna and frequency-converted to a digital signal by a frequency converter. A correlation detector uses the chip rate as a cycle frequency and calculates a cyclic correlation matrix of spread spectrum signals stored in data storage. A cycle frequency detector detects the cycle frequency of an interference signal output from A/D converter. A correlation detector uses the detection result of the cycle frequency detector as a cycle frequency and calculates a cyclic correlation matrix of the signal, which becomes an interference signal, using the signal output from A/D converter. A direction of arrival is estimated, using the cyclic correlation matrices calculated by correlation detector and the correlation detector calculates the respective eigenvalues and eigenvectors and estimates the directions of arrival of a spread spectrum signal and a signal, which becomes an interference signal.

18 Claims, 4 Drawing Sheets

DIRECTION OF ARRIVAL ESTIMATOR AND DIRECTION OF ARRIVAL ESTIMATION METHOD

BACKGROUND OF THE INVENTION

1. Field of the Invention

The present invention relates to a direction of arrival estimator and direction of arrival estimation method for estimating the direction of arrival of a reception signal using an array antenna.

2. Description of the Related Art

As a method for improving the reception quality of a base station apparatus in a radio communication system, a method of estimating the direction of arrival of a reception signal with an array antenna incorporated and focusing directivity on a desired signal is proposed. Since a signal received by the base station apparatus includes a multitude of interference signals in addition to the desired signal, the base station apparatus needs to separate all signals included in the reception signal and select the desired signal in order to estimate the direction of arrival of the desired signal.

When the base station apparatus carries out radio communication with a plurality of terminal apparatuses using a spread spectrum signal, the base station apparatus can separate all signals included in the reception signal by carrying out despreading processing, etc.

Here, there are cases where within the frequency band of a spread spectrum signal, a signal of a narrow frequency band is mixed with the spread spectrum signal such as a frequency-modulated signal and received by an antenna.

In this case, the base station apparatus cannot separate the spread spectrum signal, a desired signal, from the other signal, an interference signal, and therefore it is necessary to separate the desired signal from the interference signal in some way to estimate the direction of arrival of the desired signal.

However, no technology has been disclosed so far to distinguish the spread spectrum signal from a reception signal made up of the spread spectrum signal and a signal based on a modulation system different from that of the spread spectrum signal.

SUMMARY OF THE INVENTION

It is an object of the present invention to separate a spread spectrum signal from a reception signal made up of the spread spectrum signal and a signal based on a modulation system different from that of the spread spectrum signal and estimate its direction of arrival.

The present invention attains the above object by applying cyclostationarity of a modulated signal and selecting signals using a cycle frequency specific to its modulation system. More specifically, the spread spectrum signal is detected by using a frequency determined from its chip rate as a cycle frequency, while signals other than the spread spectrum signal are detected through cyclic frequencies specific to those signals based on differences in the modulation system and transmission speed.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below. By the way, the following embodiments assume that a spread spectrum signal is a desired signal, while a signal having a narrow frequency band with respect to the spread spectrum signal such as a frequency modulated signal and existing within the spread spectrum signal band as an interference signal.

(Embodiment 1)

Figure 1:
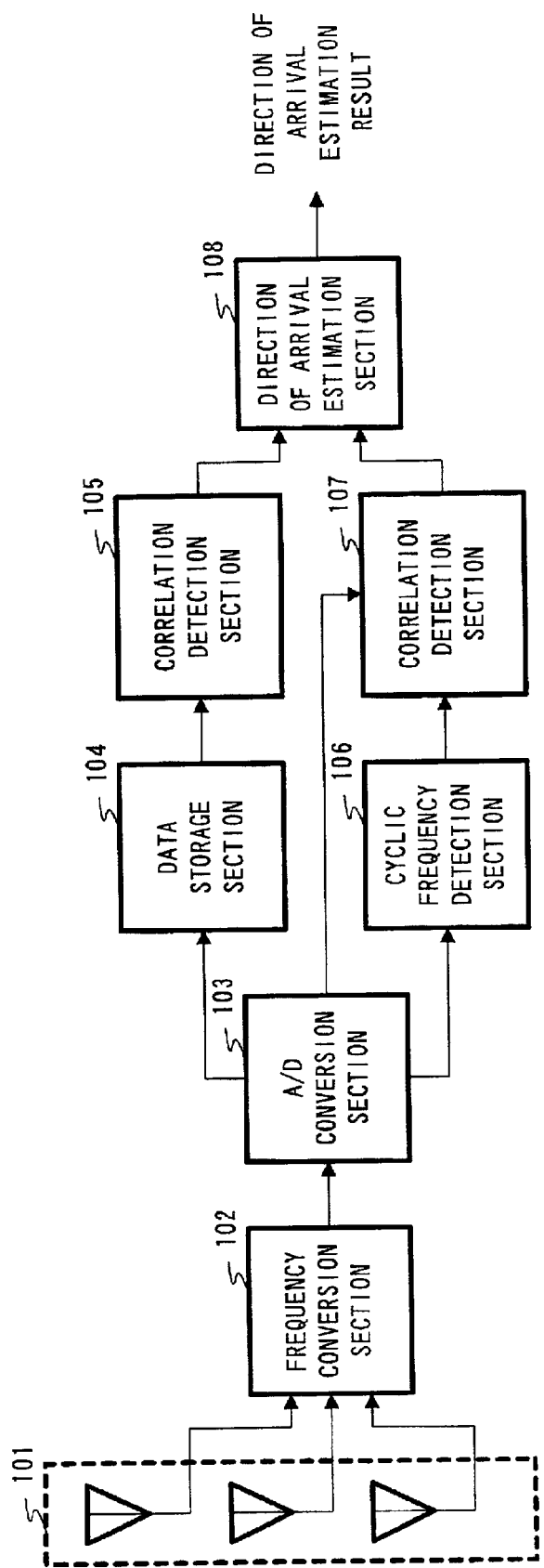
FIG. 1 is a block connection diagram of a direction of arrival estimator according to Embodiment 1 of the present invention.

FIG. 1 is a block connection diagram of a direction of arrival estimator according to Embodiment 1 of the present invention. The direction of arrival estimator shown in FIG. 1 is mainly configured by array antenna 101, frequency conversion section 102, A/D conversion section 103, data storage section 104, correlation detection section 105, cycle frequency detection section 106, correlation detection section 107 and direction of arrival estimation section 108.

Frequency conversion section 102 converts the frequency of a signal received from a terminal apparatus by array antenna 101 to an intermediate frequency or baseband frequency. A/D conversion section 103 converts the frequency-converted signal to a digital signal.

Data storage section 104 stores the digital signal output from A/D conversion section 103 until the number of spread spectrum signal chips reaches a predetermined amount (e.g., 100 chips) or more. Correlation detection section 105 uses the chip rate of a known spread spectrum signal as a cycle frequency and calculates a cyclic correlation matrix of the spread spectrum signals of data stored in data storage section 104.

Cycle frequency detection section 106 detects the cycle frequency of an interference signal using the digital signal output from A/D conversion section 103. Here, in the case where the interference signal is an amplitude-modulated signal or frequency-modulated signal, a frequency doubling the carrier frequency is detected as a cycle frequency, and in the case where the interference signal is a PSK signal, the symbol rate is detected as a cycle frequency. Thus, a cycle frequency specific to the signal depending on the modulation system and transmission speed is detected.

The method of detecting a cycle frequency by cycle frequency detection section 106 includes a method whereby a cyclic auto-correlation function is calculated by changing a cycle frequency using a digital signal made up of a reception signal of one antenna element, a maximum value of the cyclic auto-correlation row, which is the calculation result, is detected and a cycle frequency corresponding to the value is thereby detected.

Correlation detection section 107 uses the detection result of cycle frequency detection section 106 as a cycle frequency and calculates a cyclic correlation matrix of the signal, which becomes an interference signal, using the digital signal output from A/D conversion section 103.

By the way, correlation detection section 105 and correlation detection section 107 use their respective cyclic frequencies and calculate a cyclic correlation matrix using a cyclic cross correlation row of the signal received by one antenna element versus a signal received by another antenna element as a row.

Direction of arrival estimation section 108 uses the cyclic correlation matrices calculated by correlation detection section 105 and correlation detection section 107 to calculate their respective eigenvalues and eigenvectors and estimates the directions of arrival of a spread spectrum signal and a signal, which becomes an interference signal.

The technique for estimating the direction of arrival using a cyclic correlation matrix is described in detail in "Detection of Direction and Number of Impinging Signals in Array Antenna Using Cyclostationarity" by Hiroyuki Tsuji et al. (Collection of Institute of Electronics, Information and Communication Engineers, '98/1 Vol. J81-B-II No. 1 pp. 19–28). Furthermore, it is possible to estimate the number of arriving signals by deciding the magnitude of an eigenvalue. In the case of a complex eigenvalue, the magnitude is decided using its absolute value.

As shown above, the invention according to this embodiment uses cyclostationarity of modulated signals and can select signals using cyclic frequencies specific to the modulation system, making it possible to separately estimate the directions of arrival of a spread spectrum signal and a signal with a cycle frequency different from that of the spread spectrum signal that exist within a same frequency band.

(Embodiment 2)

Figure 2:
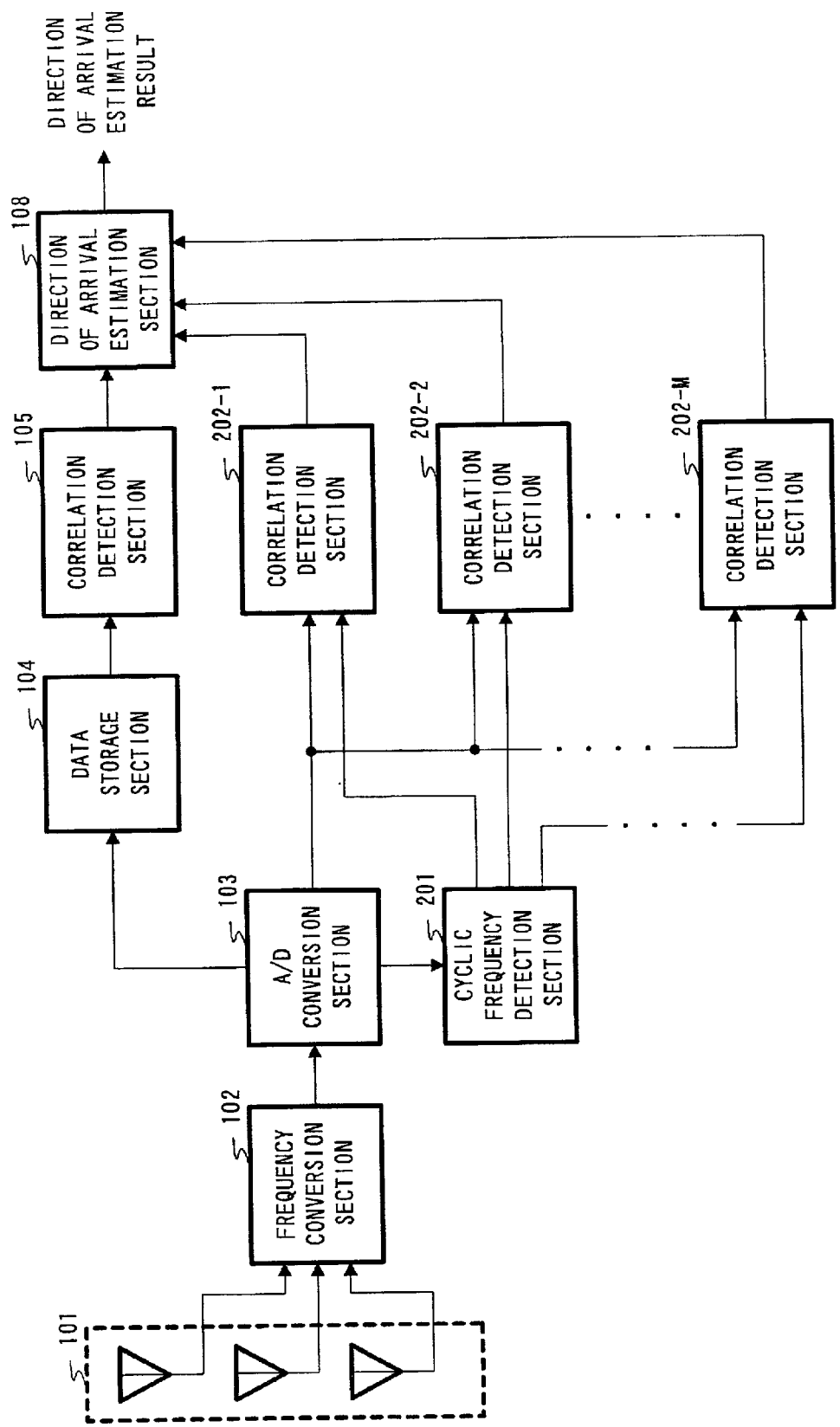
FIG. 2 is a block connection diagram of a direction of arrival estimator according to Embodiment 2 of the present invention.

FIG. 2 is a block connection diagram of a direction of arrival estimator according to Embodiment 2 of the present invention. The components in the direction of arrival estimator in FIG. 2 common to those in FIG. 1 are assigned the same reference numerals as those in FIG. 1 and explanations thereof are omitted.

The direction of arrival estimator in FIG. 2 differs from that in FIG. 1 in that cycle frequency detection section 201 detects a plurality of cyclic frequencies and M (M: natural number) correlation detection sections 202-1 to 202-M are provided.

The method of detecting a plurality of cyclic frequencies by cycle frequency detection section 201 includes a method whereby a cyclic auto-correlation function is calculated by changing a cycle frequency using a digital signal made up of a reception signal of one antenna element, a plurality of peak values of the cyclic auto-correlation row, which is the calculation result, is detected and cyclic frequencies corresponding to the values are thereby detected.

Correlation detection sections 202-1 to 202-M each calculate cyclic correlation matrices using a plurality of cyclic frequencies, which is the output of cycle frequency detection section 201 and a digital signal, which is the output of A/D conversion section 103.

Direction of arrival estimation section 108 uses the cyclic correlation matrices calculated by correlation detection section 105 and correlation detection sections 202-1 to 202-M to calculate their respective eigenvalues and eigenvectors and estimates the directions of arrival of the spread spectrum signal and all signals, which become interference signals.

Thus, the invention of this embodiment can separately estimate the directions of arrival of a spread spectrum signal and a plurality of signals with a cycle frequency different from that of the spread spectrum signal that exist within a same frequency band.

(Embodiment 3)

Figure 3:
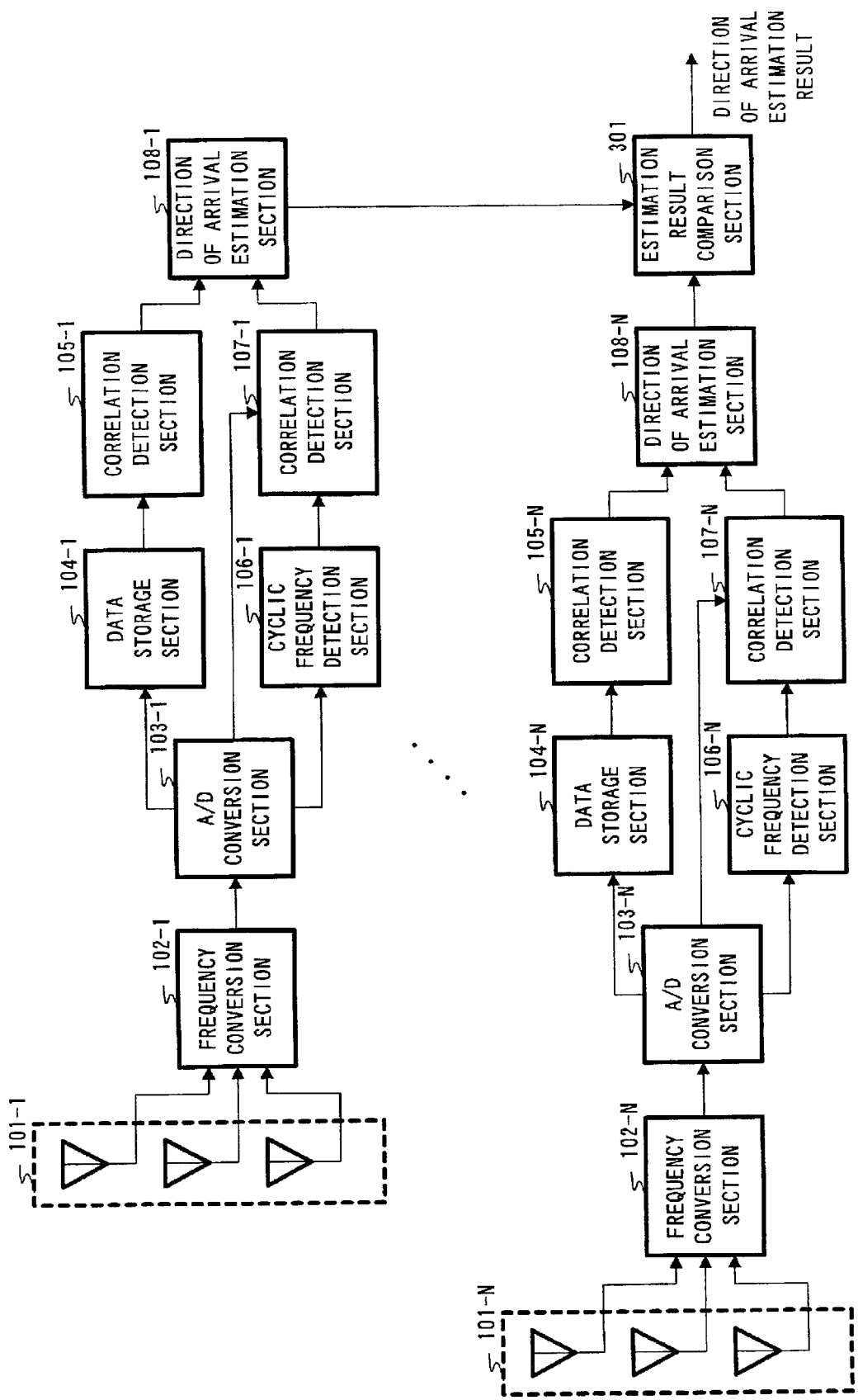
FIG. 3 is a block connection diagram of a direction of arrival estimator according to Embodiment 3 of the present invention.

FIG. 3 is a block connection diagram of a direction of arrival estimator according to Embodiment 3 of the present invention. The direction of arrival estimator in FIG. 3 differs from that in FIG. 1 in that N (N: natural number) array antennas 101-1 to 101-N, N frequency conversion sections 102-1 to 102-N, N A/D conversion sections 103-1 to 103-N, N data storage sections 104-1 to 104-N, N correlation detection sections 105-1 to 105-N, N cycle frequency detection sections 106-1 to 106-N, N correlation detection sections 107-1 to 107-N and N direction of arrival estimation sections 108-1 to 108-N are provided and estimation result comparison section 301 is added.

Figure 4:
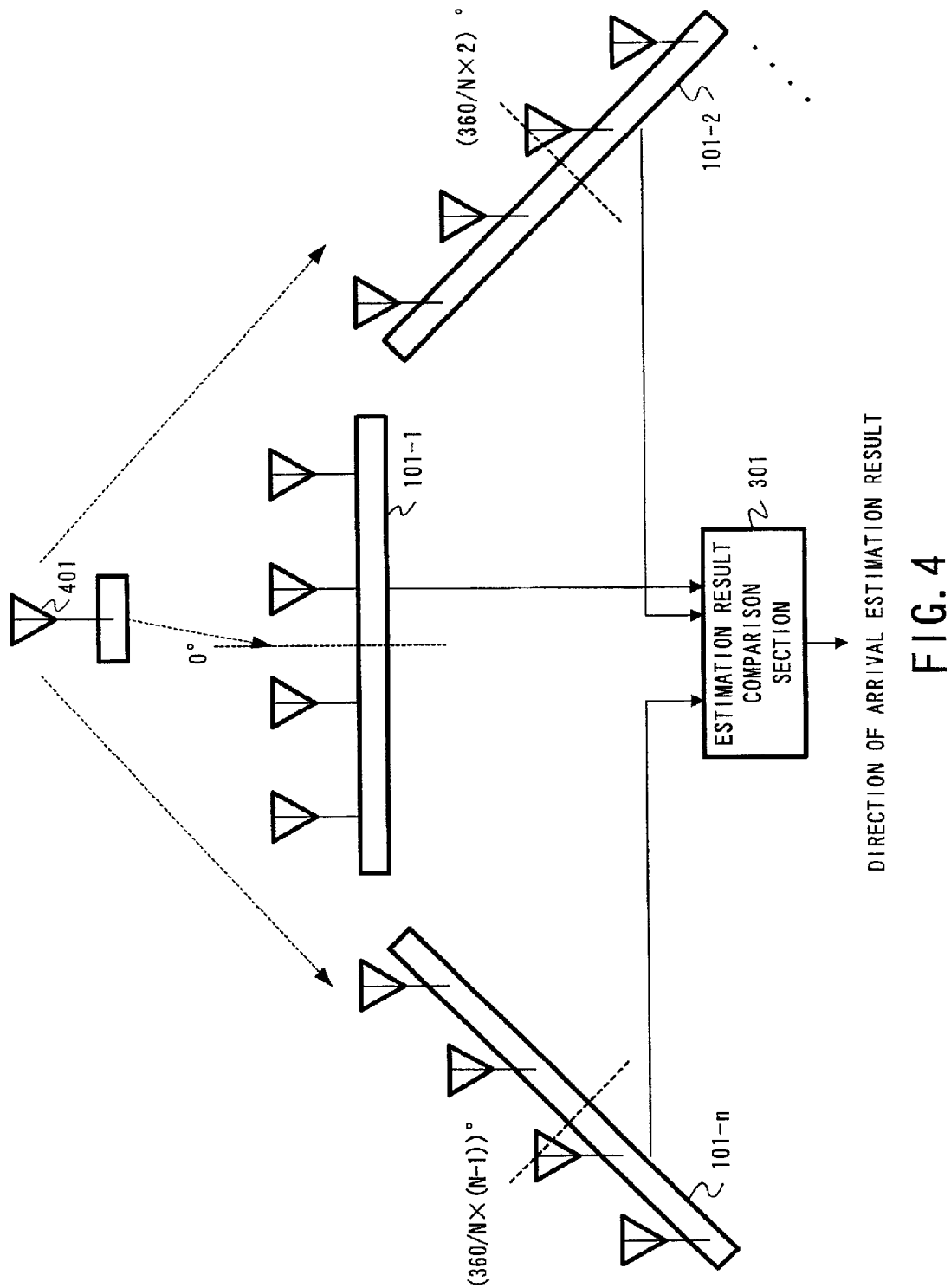
FIG. 4 illustrates a positional relationship between array antennas of the direction of arrival estimator shown in FIG. 4.

FIG. 4 illustrates a positional relationship between array antennas 101-1 to 101-N of the direction of arrival estimator shown in FIG. 3. As shown in FIG. 4, N array antennas are installed in such a way that the direction of the normal to each array antenna forms an angle of 360°/N with the direction of the normal to its adjacent array antenna.

Array antennas 101-1 to 101-N each receive a signal from terminal apparatus 401. Then, the direction of arrival is estimated according to the method described in Embodiment 1 using the reception signals of the respective array antennas. Estimation result comparison section 301 compares the estimation results of direction of arrival estimation sections 108-1 to 108-N.

Here, suppose the direction of the normal to array antenna 101-1 is decided as direction 0°. Then, based on this array antenna 101-1, corrected angles of array antennas 101-1 to 101-N are decided from the directions of the normal to array antennas 101-1 to 101-N.

Estimation result comparison section 301 corrects the estimation results of direction of arrival estimation sections 108-1 to 108-N with the corrected angles of their respective array antennas and thereby estimates the angles with respect to the direction of the normal to array antenna 101-1 and estimates their true directions of arrival for all directions by comparing the estimation results.

Thus, this embodiment can separately estimate the directions of arrival of a spread spectrum signal and a signal of a cycle frequency different from that of the spread spectrum signal that exist within a same frequency band for all directions.

As shown above, in the case where a signal having a wide frequency band such as a spread spectrum signal and a signal different from the spread spectrum signal coexist within the frequency band of the spread spectrum signal, the present invention can estimate the directions of arrival of the respective signals separately.

The present invention is not limited to the above described embodiments, and various variations and modifications may be possible without departing from the scope of the present invention.

This application is based on the Japanese Patent Application No. 2000-139994 filed on May 12, 2000, entire content of which is expressly incorporated by reference herein.

What is claimed is:

1. A direction of arrival estimator comprising:
   an array antenna that receives a signal as a reception signal from a communication terminal apparatus, the array antenna comprising a plurality of antenna elements;
   a first correlation detector that calculates a first cyclic correlation matrix using a cycle frequency of a first modulated signal that is included in the reception signal of said array antenna;

a second correlation detector that calculates a second cyclic correlation matrix using a cycle frequency of a second modulated signal whose modulation system is different from a modulation system of said first modulated signal; and a direction of arrival estimator that estimates directions of arrival of said first modulated signal and said second modulated signal using eigenvalues and eigenvectors of the cyclic correlation matrices calculated by said first and second correlation detectors.

2. The direction of arrival estimator according to claim 1, wherein, when the reception signal contains a known spread spectrum modulated signal, the first correlation detector calculates the first cyclic correlation matrix using a frequency decided from a chip rate of the known spread spectrum modulated signal as the cycle frequency of the first modulated signal.

3. The direction of arrival estimator according to claim 1, wherein the second correlation detector calculates the second cyclic correlation matrix of the second modulated signal by detecting the cycle frequency of the second modulated signal from the reception signal.

4. The direction of arrival estimator according to claim 2, further comprising a data storage that stores the reception signal, wherein the first correlation detector calculates the first cyclic correlation matrix using the data stored in said data storage.

5. The direction of arrival estimator according to claim 1, wherein, when there is a plurality of eigenvalues, the direction of arrival estimator uses absolute values of said plurality of eigenvalues to distinguish magnitudes of the plurality of eigenvalues.

6. The direction of arrival estimator according to claim 1, wherein the second correlation detector detects a plurality of cyclic frequencies from a plurality of second modulated signals of the reception signal and calculates the second cyclic correlation matrix of the plurality of second modulated signals.

7. A base station apparatus equipped with a direction of arrival estimator, said direction of arrival estimator comprising:

an array antenna that receives a signal as a reception signal from a communication terminal apparatus, the array antenna comprising a plurality of antenna elements;

a first correlation detector that calculates a first cyclic correlation matrix using a cycle frequency of a first modulated signal that is included in the reception signal of said array antenna;

a second correlation detector that calculates a second cyclic correlation matrix using a cycle frequency of a second modulated signal whose modulation system is different from a modulation system of said first modulated signal; and a direction of arrival estimator that estimates directions of arrival of said first modulated signal and said second modulated signal using eigenvalues and eigenvectors of the cyclic correlation matrices calculated by said first and second correlation detectors.

8. The direction of arrival estimator according to claim 7, wherein, when the reception signal contains a known spread spectrum modulated signal, the first correlation detector calculates the first cyclic correlation matrix using a frequency decided from a chip rate of the known spread spectrum modulated signal as the cycle frequency of the first modulated signal.

9. The direction of arrival estimator according to claim 7, wherein the second correlation detector calculates the second cyclic correlation matrix of the second modulated signal by detecting the cycle frequency of the second modulated signal from the reception signal.

10. The direction of arrival estimator according to claim 8, further comprising a data storage that stores the reception signal, wherein the first correlation detector calculates the first cyclic correlation matrix using the data stored in said data storage.

11. The direction of arrival estimator according to claim 7, wherein, when there is a plurality of eigenvalues, the direction of arrival estimator uses absolute values of said plurality eigenvalues to distinguish magnitudes of the plurality of eigenvalues.

12. The direction of arrival estimator according to claim 7, wherein the second correlation detector detects a plurality of cyclic frequencies from a plurality of second modulated signals of the reception signal and calculates the second cyclic correlation matrix of the plurality of second modulated signals.

13. A direction of arrival estimation method comprising:

performing a first calculation calculating a first cyclic correlation matrix using a cycle frequency of a first modulated signal received by an array antenna;

performing a second calculation calculating a second cyclic correlation matrix using a cycle frequency of a second modulated signal whose modulation system is different from a modulation system of the first modulated signal; and estimating directions of arrival of the first modulated signal and the second modulated signal using eigenvalues and eigenvectors of the calculated cyclic correlation matrices.

14. The direction of arrival estimation method according to claim 13, wherein, when the reception signal contains a known spread spectrum modulated signal, the first calculation calculates the first cyclic correlation matrix using a frequency decided from a chip rate of the known spread spectrum modulated signal as the cycle frequency of the first modulated signal.

15. The direction of arrival estimating method according to claim 13, wherein the second calculation calculates the second cyclic correlation matrix of the second modulated signal by detecting the cycle frequency of the second modulated signal from the reception signal.

16. The direction of arrival estimator according to claim 14, further comprising storing data of the reception signal, wherein the first calculation calculates the first cyclic correlation matrix using the stored data.

17. The direction of arrival estimator according to claim 13, wherein, when there is a plurality of eigenvalues, the estimating comprises using absolute values of the plurality of eigenvalues to distinguish magnitudes of the plurality of eigenvalues.

18. The direction of arrival estimator according to claim 13, wherein the second calculation detects a plurality of cyclic frequencies performing a first calculation calculating a first cyclic and calculates the second cyclic correlation matrix of the plurality of second modulated signals.

* * * * *

UNITED STATES PATENT AND TRADEMARK OFFICE
CERTIFICATE OF CORRECTION

PATENT NO. : 6,922,450 B2
DATED : July 26, 2005
INVENTOR(S) : Y. Yuda et al.

It is certified that error appears in the above-identified patent and that said Letters Patent is hereby corrected as shown below:

Column 6,
Line 16, after "plurality" insert -- of --.
Lines 61-62, "performing a first calculation calculating a first cyclic" should be -- from a plurality of second modulated signals of the reception signal --.

Signed and Sealed this

Twentieth Day of December, 2005

JON W. DUDAS
*Director of the United States Patent and Trademark Office*